US012602826B2

(12) United States Patent
Wang et al.

(10) Patent No.: US 12,602,826 B2
(45) Date of Patent: Apr. 14, 2026

(54) NEURAL NETWORK-BASED POSE ESTIMATION AND REGISTRATION METHOD AND DEVICE FOR HETEROGENEOUS IMAGES, AND MEDIUM

(71) Applicant: ZHEJIANG UNIVERSITY, Zhejiang (CN)

(72) Inventors: Yue Wang, Hangzhou (CN); Zexi Chen, Hangzhou (CN); Xuecheng Xu, Hangzhou (CN); Rong Xiong, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 308 days.

(21) Appl. No.: 18/512,075

(22) Filed: Nov. 17, 2023

(65) Prior Publication Data

US 2024/0169584 A1 May 23, 2024

Related U.S. Application Data

(63) Continuation of application No. PCT/CN2021/099255, filed on Jun. 9, 2021.

(30) Foreign Application Priority Data

May 18, 2021 (CN) .......................... 202110540496.1

(51) Int. Cl.
| | |
|---|---|
| *G06T 7/73* | (2017.01) |
| *G06T 7/32* | (2017.01) |
| *G06T 7/33* | (2017.01) |

(52) U.S. Cl.
CPC .................. *G06T 7/74* (2017.01); *G06T 7/32* (2017.01); *G06T 7/337* (2017.01); (Continued)

(58) Field of Classification Search
CPC .. G06T 7/74; G06T 7/32; G06T 7/337; G06T 2207/20056; G06T 2207/20081; (Continued)

(56) References Cited

U.S. PATENT DOCUMENTS

2018/0018808 A1* 1/2018 Punjani ................... G06T 19/20
2020/0184641 A1* 6/2020 Schmidt ............... G06V 20/698

FOREIGN PATENT DOCUMENTS

CN 102521834 A * 6/2012
CN 103020945 A * 4/2013
(Continued)

OTHER PUBLICATIONS

Chen, Zexi, et al. "Deep phase correlation for end-to-end heterogeneous sensor measurements matching." arXiv preprint arXiv: 2008.09474 (2020). (Year: 2020).*

(Continued)

*Primary Examiner* — Gregory A Morse
*Assistant Examiner* — Renae A Bitor
(74) *Attorney, Agent, or Firm* — Wiersch Law Group

(57) ABSTRACT

The present invention relates to the field of image processing. Disclosed are a neural network-based pose estimation and registration method for heterogeneous images. In the present invention, a phase correlation algorithm is optimized to be differentiable and embedded into an end-to-end learning network framework, and a neural network-based pose estimation method for heterogeneous images is constructed. According to the method, an optimal feature extractor can be found for a result of image matching, a solution can be obtained without exhaustive evaluation, and good interpretability and generalization capability are achieved. The test results show that the present invention allows for accurate pose estimation and registration for heterogeneous images and shortening of the required time, has high accuracy and real-time performance, can meet actual application requirements, and can be applied in fields such as robot self-positioning.

7 Claims, 3 Drawing Sheets

*FFT*: Fast Fourier transform
*LPT*: Logarithmic polar coordinate transform
*ERR*: Error
*BP*: Back propagation
*DC*: Differentiable correlation

(52) U.S. Cl.
CPC .............. *G06T 2207/20056* (2013.01); *G06T 2207/20081* (2013.01); *G06T 2207/20084* (2013.01)

(58) Field of Classification Search
CPC . G06T 2207/20084; G06T 2207/10032; G06T 2207/30244; G06T 7/33; G06N 3/08; G06N 3/045
See application file for complete search history.

(56) References Cited

FOREIGN PATENT DOCUMENTS

| | | | | | | |
|---|---|---|---|---|---|---|
| CN | 103606139 | A | * | 2/2014 | | |
| CN | 104596502 | A | * | 5/2015 | ............ | G01C 11/04 |
| CN | 105427298 | A | * | 3/2016 | | |
| CN | 107036594 | A | * | 8/2017 | ............ | G01C 21/04 |
| CN | 108765479 | A | * | 11/2018 | ............... | G06T 7/55 |
| CN | 111325794 | A | * | 6/2020 | ............ | G06T 9/004 |
| KR | 20200078013 | A | * | 7/2020 | ............ | G06T 17/05 |

OTHER PUBLICATIONS

International Search Report (PCT/CN2021/099255); Date of Mailing: Jan. 29, 2022.
Notice of Allowance(CN202110540496.1); Date of Mailing: Feb. 16, 2022.
Deep-Phase-Correlation-for-End-to-End-Heterogeneous-Sensor-Measurements-Matching.

* cited by examiner

*FFT*: Fast Fourier transform
*LPT*: Logarithmic polar coordinate transform
*ERR*: Error
*BP*: Back propagation
*DC*: Differentiable correlation Template image Image to be matched Matching result

1

NEURAL NETWORK-BASED POSE ESTIMATION AND REGISTRATION METHOD AND DEVICE FOR HETEROGENEOUS IMAGES, AND MEDIUM

CROSS-REFERENCE TO RELATED APPLICATION

The present application is a continuation of International Application No. PCT/CN2021/099255, filed on Jun. 9, 2021, which claims priority to Chinese Application No. 202110540496.1, filed on May 18, 2021, the contents of both of which are incorporated herein by reference in their entireties.

TECHNICAL FIELD

The present disclosure belongs to the field of image processing and, in particular, to an image pose estimation and matching method.

BACKGROUND

Self-positioning is one of the most basic problems of mobile robots. After more than a decade of research, it is relatively mature to locate a given observation in a map established by the same sensor. However, measurement matching from a heterogeneous sensor is still an open problem. The heterogeneous sensor is limited by their own characteristics, and the two images obtained are heterogeneous images with differences in angle, proportion and viewing angle. Moreover, the sensor may be disturbed by illumination, shadow, occlusion and the like when acquiring graphics, and these interferences can make pose estimation extremely difficult. Considering the positive progress made by researchers in building maps in recent years, it is desirable to complete the matching of heterogeneous images obtained by multiple sensors by building maps, such that the map formed after matching can be shared by multiple robots equipped with heterogeneous sensors.

There are two categories of existing technologies for matching isomorphic images: one is to locate in a specific scene by matching point features, and the other is to find the best candidate position in a solution space by applying related methods. However, for heterogeneous images, the effects of all these methods are not ideal.

Therefore, it is an urgent technical problem to design a method for pose estimation and registration of heterogeneous images.

SUMMARY

The present disclosure aims at solving the problem that it is difficult to realize pose estimation and registration of heterogeneous images in the prior art, and provides methods for pose estimation and registration for heterogeneous images based on a neural network.

The specific technical solution adopted by the present disclosure is as follows:

In a first aspect, the present disclosure provides a neural network-based pose estimation method for heterogeneous images, which includes the following steps:

S1, taking a first pre-trained U-Net network and a second pre-trained U-Net network as two feature extractors, taking a heterogeneous template image and a picture to be matched as two original input pictures of the two feature extractors, respectively, and extracting isomorphic features in the two original input pictures to obtain a first feature map and a second feature map which are isomorphic;

S2, performing a Fourier transform on the first feature map and the second feature map obtained in S1, respectively, to obtain respective magnitude spectra;

S3, performing a logarithmic polar coordinate transform on the two magnitude spectra obtained in S2, respectively, to allow the two magnitude spectra to be transformed from a Cartesian coordinate system to a logarithmic polar coordinate system, so that a rotation transform between the two magnitude spectra in the Cartesian coordinate system is mapped into a translation transform in a y direction in the logarithmic polar coordinate system;

S4, performing a phase correlation solution on the two magnitude spectra after coordinate transform in S3 to obtain a translation transform relation between the two magnitude spectra, and then re-transforming according to a mapping relation between the Cartesian coordinate system and the logarithmic polar coordinate system in S3 to obtain a rotation transform relation between the template image and the picture to be matched;

S5, taking a third pre-trained U-Net network and a fourth pre-trained U-Net network as two feature extractors, taking a heterogeneous template image and a picture to be matched as two original input pictures of the two feature extractors, respectively, and extracting isomorphic features in the two original input pictures to obtain a third feature map and a fourth feature map which are isomorphic;

S6, performing a Fourier transform on the third feature map and the fourth feature map obtained in S5, respectively, to obtain respective magnitude spectra;

S7, performing a logarithmic polar coordinate transform on the two magnitude spectra obtained in S6, respectively, to allow the two magnitude spectra to be transformed from a Cartesian coordinate system to a logarithmic polar coordinate system, so that a scaling transform between the two magnitude spectra in the Cartesian coordinate system is mapped into a translation transform in an x direction in the logarithmic polar coordinate system;

S8, performing a phase correlation solution on the two magnitude spectra after coordinate transform in S7 to obtain a translation transform relation between the two magnitude spectra, and then re-transforming according to a mapping relation between the Cartesian coordinate system and the logarithmic polar coordinate system in S7 to obtain a scaling transform relation between the template image and the picture to be matched;

S9, performing corresponding rotation and scaling transforms on the picture to be matched according to the rotation transform relation and scaling transform relation obtained in S4 and S8 to obtain a new template image of the picture to be matched;

S10, taking a fifth pre-trained U-Net network and a sixth pre-trained U-Net network as two feature extractors, taking a template image and a new picture to be matched as two original input pictures of the two feature extractors, respectively, and extracting isomorphic features in the two original input pictures to obtain a fifth feature map and a sixth feature map that are isomorphic;

S11, performing a phase correlation solution on the fifth feature map and the sixth feature map obtained in S10 to obtain a translation transform relation in the x direction between the template image and the picture to be matched;

S12, taking a seventh pre-trained U-Net network and a eighth pre-trained U-Net network as two feature extractors, taking a template image and a new picture to be matched as original input pictures of the two feature extractors, respectively, extracting isomorphic features in the two original input pictures, and obtaining a seventh feature map and an eighth feature map which are isomorphic and only retain a translation transform relation between the original input pictures; and S13, performing a phase correlation solution on the seventh feature map and the eighth feature map obtained in S12 to obtain a translation transform relation in the y direction between the template image and the picture to be matched, and completing a pose estimation of three transform relations of rotation, scaling and translation between the heterogeneous template image and the picture to be matched.

In a second aspect, the present disclosure provides a neural network-based registration method for heterogeneous images, a pose estimation between a template image and a picture to be matched is obtained according to the pose estimation method for heterogeneous images according to the first aspect, and then the picture to be matched is simultaneously rotated, scaled and translated according to estimated transform relations so as to be registered to the template image, and matching and splicing between the template image and the picture to be matched are realized.

Compared with the prior art, the present disclosure has the following beneficial effects:

In the present disclosure, a phase correlation algorithm is optimized to be differentiable and embedded into an end-to-end learning network framework, and a neural network-based pose estimation method for heterogeneous images is constructed. According to the method, an optimal feature extractor can be found for a result of image matching, a solution can be obtained without exhaustive evaluation, and good interpretability and generalization capability are achieved. The test results show that the present disclosure allows for accurate pose estimation and registration for heterogeneous images and shortening of the required time, has high accuracy and real-time performance, can meet actual application requirements, and can be applied in fields such as robot self-positioning.

DESCRIPTION OF EMBODIMENTS

The present disclosure will be further elaborated and explained with the attached drawings and specific embodiments. The technical features of each embodiment of the present disclosure can be combined accordingly without conflicting with each other.

A heterogeneous sensor is limited by its own characteristics, and the two images it obtains belong to heterogeneous images with differences in angle, proportion and viewing angle. Moreover, the sensor will be disturbed by different illumination, shadow, occlusion and the like when acquiring graphics, and these interferences will make pose estimation extremely difficult. For example, $O_1$ is obtained by an aerial camera of a UAV in the early morning, while $O_2$ is a local elevation map constructed by a ground robot with lidar. These two kinds of images belong to heterogeneous images, and they cannot be directly matched. In order to solve this problem, a general processing method is to extract features from two images and estimate the relative attitude with features instead of the original sensor measurements.

Aiming at heterogeneous images obtained by heterogeneous sensors, the present disclosure constructs a neural network-based pose estimation method for heterogeneous images to estimate the pose transform relation between any two heterogeneous images. This estimation method is realized by a pose estimator based on a neural network, and its essence is a differentiable phase correlation algorithm. Phase correlation is a kind of matcher based on similarity, which performs well for inputs with the same mode, but can only complete matching under the condition of small high-frequency noise. The phase correlation algorithm is optimized to be differentiable and embedded into an end-to-end learning network framework to form a pose estimator. This architecture enables the system to find the optimal feature extractor for the results of image matching. Specifically, the present disclosure adopts the traditional phase correlation, and endows the fast Fourier transform layer (FFT), the logarithmic polarity transform layer (LPT) and the phase correlation layer (DC) with differentiable properties, so that they can be used for the training of the end-to-end pose estimator.

Figure 1:
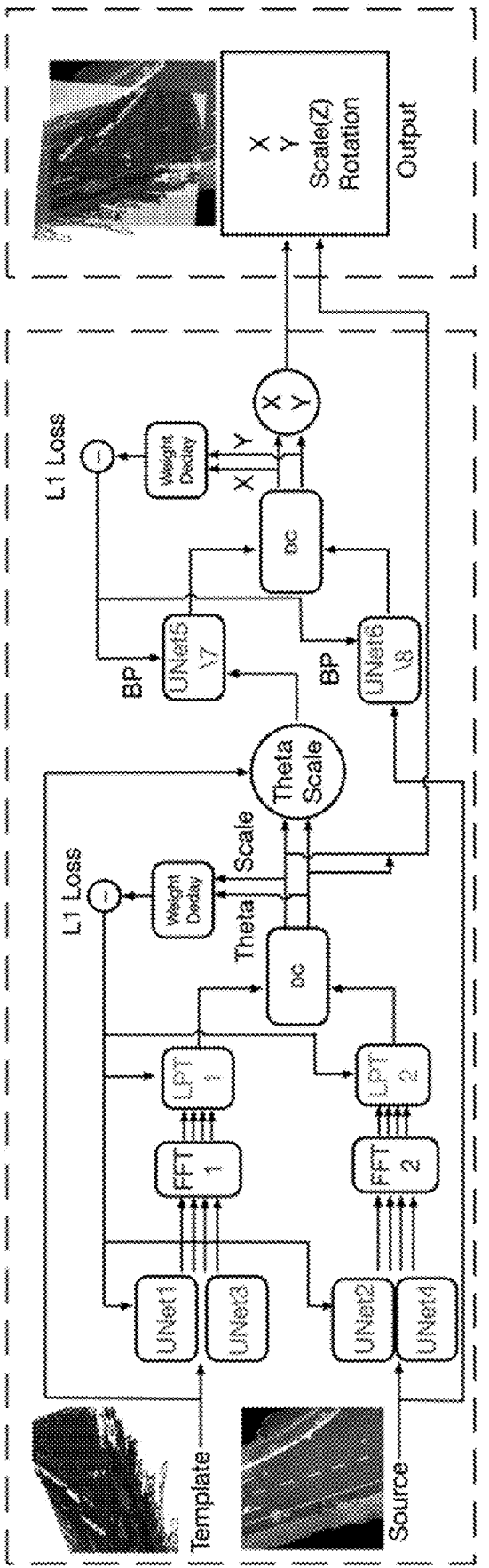
FIG. 1 is a schematic diagram of a network frame structure of a pose estimator in the present disclosure.

As shown in FIG. 1, the network framework structure of the pose estimator constructed in a preferred embodiment of the present disclosure is composed of eight independent U-Net networks, a Fourier transform layer (FFT), a logarithmic polarity transform layer (LPT) and a phase correlation layer (DC). The input of the pose estimator is a pair of heterogeneous graphs, which are recorded as a template image Source and a picture to be matched Template, and its final output is three kinds of pose transform relations needed to register the template image and the picture to be matched, namely translation, rotation and scaling. The template image is used as a matching template, and the picture to be matched can be matched and spliced on the template image after pose transform.

In order to solve the problem that heterogeneous images cannot be directly registered, the general processing method is to extract features from two images and estimate the relative attitude with features instead of the original sensor measurements. In the traditional phase correlation algorithm, a high-pass filter is used to suppress the random noise of two inputs, and this process can be regarded as a feature extractor. But for a pair of input heterogeneous images, there are obvious changes between them, and a high-pass filter is far from enough. Considering that there is no common feature to directly supervise the feature extractor, the present disclosure uses end-to-end learning to solve this problem. In the present disclosure, eight independent trainable U-Net networks (denoted as U-Net1 to U-Net8) are respectively constructed for the template image and the source image in the rotation scaling stage and the translation stage. These eight U-Net networks can extract isomorphic features, namely common features, from heterogeneous images after being trained in advance under the supervision of translation, rotation and scaling losses, so as to convert two heterogeneous images into two isomorphic feature maps. In the present disclosure, if only four U-Net networks are provided, the solutions of rotation and scaling transforms need to be coupled, and the solutions of the x-direction translation and y-direction translation also need to be coupled, and the features extracted by the feature extractor trained in this way have poor effects; Therefore, the rotation, scaling, x translation and y translation are decoupled, and respective U-Net networks are trained to get a total of eight U-Net networks to improve the accuracy.

In this embodiment, for eight independent U-Net networks, the input and output sizes are 256×256 respectively. Each U-Net network is composed of four down-sampled encoder layers and four up-sampled decoder layers to extract features. With the progress of training, the parameters of eight U-Net will be adjusted. Please note that this network is lightweight, therefore it is efficient and real-time enough to meet the requirements of application scenarios.

In addition, the function of the Fourier transform layer (FFT) is to perform Fourier transform on the feature map extracted by U-Net network, and remove the translation transform relation between images but keep the rotation and scaling transform relations. Because according to the characteristics of Fourier transform, only rotation and proportion have influence on the magnitude of spectrum, but the magnitude of spectrum is insensitive to translation. Therefore, after introducing the FFT, a representation method that is insensitive to translation but particularly sensitive to scaling and rotation is obtained, therefore translation can be ignored in the subsequent solution of scaling and rotation.

In addition, the function of the logarithmic polar transform layer (LPT) is to perform logarithmic polar coordinate transform on the FFT-transformed image, and map the image from a Cartesian coordinate system to a logarithmic polar coordinate system. In this mapping process, scaling and rotation in the Cartesian coordinate system can be converted into translation in the logarithmic polar coordinate system. The cross-correlation form about scaling and rotation may be obtained from the coordinate system transform, and all exhaustive evaluations in the whole pose estimator may be eliminated.

In addition, the function of the phase correlation layer (DC) is to solve the phase correlation, that is, to calculate the cross correlation between the two magnitude spectra. According to the correlation obtained by solving, the translation transform relation between them can be obtained. The specific calculation process of cross-correlation belongs to the prior art, and will not be repeated here.

Based on the pose estimator, the pose estimation process of heterogeneous images in a preferred embodiment of the present disclosure is described in detail below, and the steps are as follows:

S1: a first U-Net network U-Net and a second U-Net network U-Net2 trained in advance are used as two feature extractors, and a heterogeneous template image and a picture to be matched are respectively used as the original input pictures of the two feature extractors U-Net1 and U-Net2 (that is, the template image is input into U-Net1 and the picture to be matched is input into U-Net2, the same below); isomorphic features are extracted from two original input pictures to obtain a first feature map and a second feature map that are isomorphic, and at this time, the translation, rotation and scaling transform relations between the original input pictures are retained in both the first feature map and the second feature map.

S2: the first feature map and the second feature map obtained in S1 are respectively subjected to a first Fourier transform operation (denoted as FFT1), and then their respective magnitude spectra are obtained; at this time, the rotation and scaling transform relations between the two magnitude spectra are retained between the original input pictures, but the translation transform relation has been filtered out in FFT1.

S3: the two magnitude spectra obtained in S2 are respectively subjected to a first logarithmic polar coordinate transform operation (recorded as LPT1), so that they are transformed from a Cartesian coordinate system to a logarithmic polar coordinate system, and the rotation transform between the two magnitude spectra in the Cartesian coordinate system is mapped into a translation transform in the y direction in the logarithmic polar coordinate system.

S4: the two magnitude spectra after coordinate transforms in S3 are subjected to a phase correlation solution in a phase correlation layer (DC) to obtain the translation transform relation between them. It should be noted that in LPT1 of S3, there is a mapping relation between the rotation transform in the Cartesian coordinate system and the translation transform in the y direction in the logarithmic polar coordinate system, so the translation transform relation can be re-transformed according to the mapping relation between the Cartesian coordinate system and the logarithmic polar coordinate system in S3, and the rotation transform relation between the template image and the picture to be matched can be obtained.

The above rotation transform relation is essentially the angle theta by which the picture to be matched needs to be rotated to achieve registration with the template image.

S5: similarly, a third U-Net network U-Net3 and a fourth U-Net network U-Net4 trained in advance are used as two feature extractors, and a heterogeneous template image and a picture to be matched are respectively used as the original input pictures of the two feature extractors U-Net3 and U-Net4; the isomorphic features in the two original input pictures are extracted to obtain a third feature map and a fourth feature map that are the isomorphic; at this time, the translation, rotation and scaling transform relations between the original input pictures are also retained in the third feature map and the fourth feature map.

S6: the third feature map and the fourth feature map obtained in S5 are respectively subjected to a second Fourier transform operation (denoted as FFT2), and then their respective magnitude spectra are obtained; similarly, the rotation and scaling transform relations between the two magnitude spectra are retained between the original input pictures, while the translation transform relation has been filtered out in FFT2.

S7: the two magnitude spectra obtained in S6 are respectively subjected to a second logarithmic polar transform operation (LPT2) to be transformed from the Cartesian coordinate system to the logarithmic polar coordinate system, so that the scaling transform between the two magnitude spectra in the Cartesian coordinate system is mapped to the translation transform in the x direction in the logarithmic polar coordinate system.

S8: a phase correlation solution is performed on the two magnitude spectra after coordinate transforms in S7 in the phase correlation layer (DC) to obtain the translation transform relation between them; similarly, in LPT2 of S7, there is a mapping relation between the rotation transform in the Cartesian coordinate system and the translation transform in the x direction in the logarithmic polar coordinate system, therefore, it can be re-transformed according to the mapping relation between the Cartesian coordinate system and the logarithmic polar coordinate system in S7 to obtain the scaling transform relation between the template image and the picture to be matched.

The above scaling transform relation is essentially the scale that the picture to be matched needs to be scaled to realize the registration with the template image.

Thus, through the above steps, the rotation transform relation and scaling transform relation between the template image and the picture to be matched have been obtained.

S9: corresponding rotation and scaling transforms are performed on the picture to be matched according to the rotation transform relation and scaling transform relation obtained in S4 and S8 to obtain a new picture to be matched; since there is no difference in angle and proportion between the template image and the picture to be matched after rotation and scaling transforms, there is only a translation transform relation between the new picture to be matched and the input template image at present, but there is no rotation transform relation or scaling transform relation, and only a translation transform is needed subsequently to eliminate the translation difference between them; for the translation transform relation, the translation transform relations in x and y directions can be obtained only by a phase correlation solution.

S10: a fifth U-Net network U-Net5 and a sixth U-Net network U-Net6 that are trained in advance are taken as two feature extractors, and a template image and a new picture to be matched are taken as the original input pictures of the two feature extractors U-Net5 and U-Net6, respectively; the isomorphic features in the two original input pictures are extracted to obtain a fifth feature map and a sixth feature map that are isomorphic; at this time, only the translation transform relation between the original input pictures is retained in the fifth feature map and the sixth feature map, but there is no rotation and scaling transform relations.

S11: the fifth feature map and the sixth feature map obtained in S10 are subjected to phase correlation solution in a phase correlation layer (DC) to obtain a translation transform relation X in the x direction between the template image and the picture to be matched.

S12: a seventh U-Net network U-Net7 and an eighth U-Net network U-Net8 that are trained in advance are used as two feature extractors, and a template image and a new picture to be matched are used as the original input pictures of the two feature extractors U-Net7 and U-Net8, respectively; isomorphic features in the two original input pictures are extracted to obtain a seventh feature map and an eighth feature map that are isomorphic; at this time, only the translation transform relation between the original input pictures is retained in the seventh feature map and the eighth feature map, but there is no rotation and scaling transform relations.

S13: the seventh feature map and the eighth feature map obtained in S12 are subjected to a phase correlation solution in a phase correlation layer (DC) to obtain a translation transform relation Y in the y direction between the template image and the picture to be matched.

The translation transform relation in the x direction and the translation transform relation in the y direction are essentially a distance X and a distance Y by which the picture to be matched needs to be translated in the x direction and in the y direction respectively to realize the registration with the template image.

Figure 2:
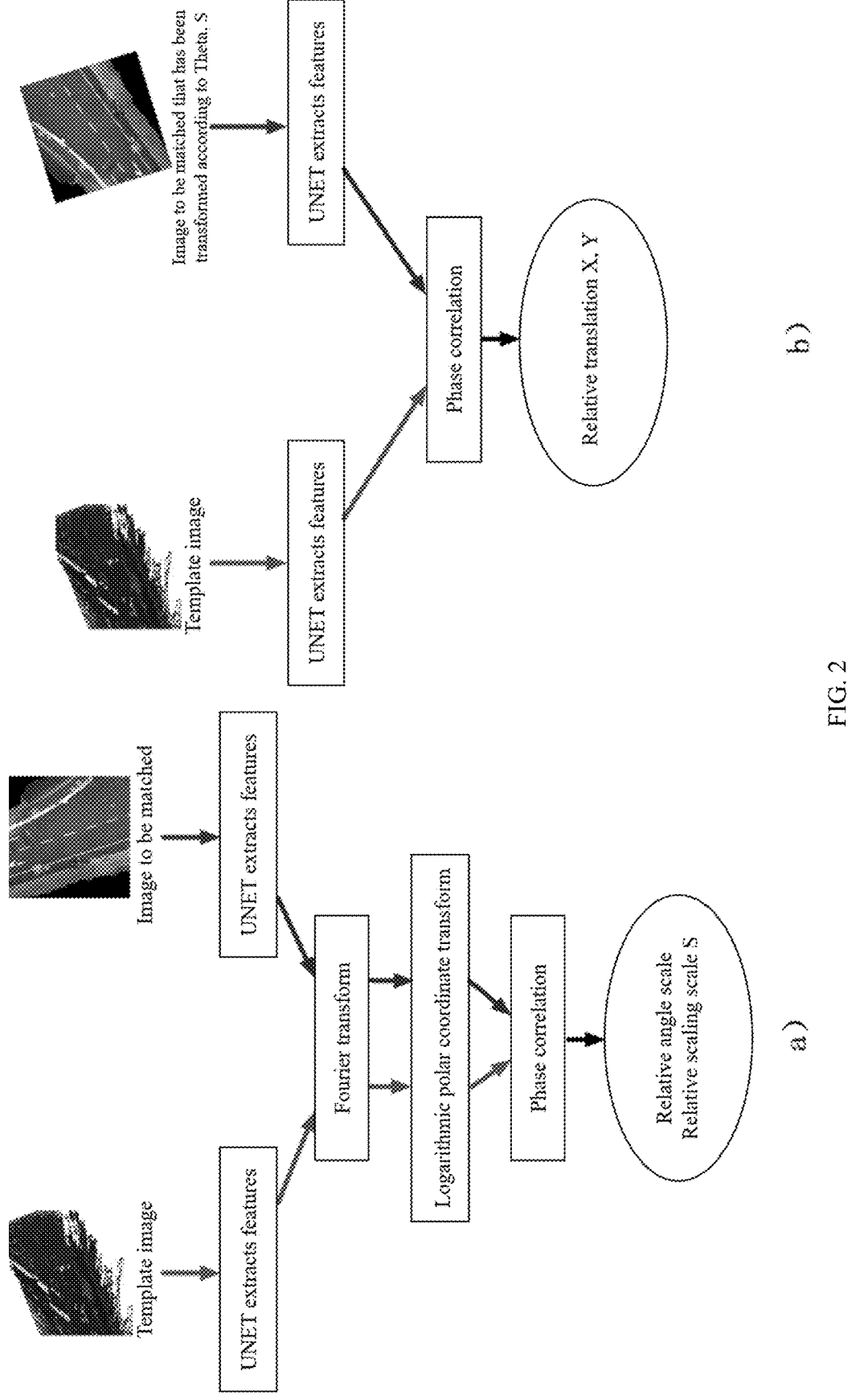
FIG. 2 is a flow chart of two stages of the pose estimation method of the present disclosure.

Thus, the pose estimation of the present disclosure is realized in two stages, and the estimated values of four degrees of freedom (X, Y, theta, scale) are obtained. Firstly, the relation between rotation and scaling is estimated through a rotation and scaling stage from S1 to S9, and then the relation between translation and transform is estimated through a translation stage from S10 to S13. The processing procedures of S1 to S9 can be shown in a) in FIG. 2, and the processing procedures of S10 to S13 can be shown in b) in FIG. 2.

By combining the results of S4, S8, S11 and S13, the pose estimation values of three transform relations of rotation, scaling and translation between the heterogeneous template image and the picture to be matched may be obtained, thereby completing the pose estimation process of the two, and then the heterogeneous images may be registered according to the corresponding estimation values.

It should be noted that in the above pose estimator, eight U-Net networks are trained in advance, and in order to ensure that each U-Net network can accurately extract isomorphic features, it is necessary to set a reasonable loss function. The total loss function of training should be the weighted sum of a rotation transform relation loss, a scaling transform relation loss, a translation transform relation loss in the x direction and a translation transform relation loss in the y direction between the template image and the picture to be matched, and the specific weighted values can be adjusted according to the actual situation.

In this embodiment, the weighted weights of the four kinds of losses in the total loss function are all 1, and all four kinds of losses adopt a L1 loss, and the four kinds of loss functions are as follows:

the rotation relation theta predicted in S4 is recorded as theta_predict, the scaling relation scale predicted in S8 is recorded as scale_predict, the translation transform X in the x direction predicted in S11 is recorded as x_predict, and the translation transform Y in the y direction predicted in S13 is recorded as y_predict. Therefore, the translation (x_predict,y_predict), rotation (theta_predict) and scaling (scale_predict) relations between two heterogeneous pictures are obtained in each round of training.

1) In the model, the obtained theta_predict and its true value theta_gt are subjected to 1 norm distance loss, L_theta=(theta_gt-theta_predict), and L_theta is returned to train U-Net1 and U-Net2, so that they can extract better features for calculating the feature of theta_predict.

2) The calculated scale_predict and its true value scale_gt are subjected to 1 norm distance loss, L_scale=(scale_gt-scale_predict), and L_scale is returned to train U-Net3 and U-Net4, so that they can extract better features for calculating the feature of scale_predict.

3) The calculated x_predict and its true value x_gt are subjected to 1 norm distance loss, L_x=(x_gt-x_predict), and L_x is returned to train U-Net5 and U-Net6, so that they can extract better features for calculating the feature of x_predict.

4) The calculated y_predict and its true value y_gt are subjected to 1 norm distance loss, L_y=(y_gt-y_predict), and L_y is returned to train U-Net7 and U-Net8, so that they can extract better features for calculating the feature of y_predict.

Therefore, the total loss function is L=L_x+L_y+ L_theta+L_scale. In the training process, the model parameters of eight U-Net networks are optimized by a gradient descent method to minimize the total loss function. After the training, eight U-Net networks form a pose estimator for estimating the pose of the actual heterogeneous images. In this pose estimator, the pose of two heterogeneous images can be estimated according to the method in the above S1-S13, and the images can be registered according to the estimation results.

In the present disclosure, on the basis of the pose estimation between the template image and the picture to be matched obtained by the pose estimation method of heterogeneous images, a heterogeneous image registration method based on a neural network can be further provided, which includes the following steps: simultaneously performing rotation, scaling and translation transforms on the picture to be matched according to the estimated values (X, Y, theta, scale) of the three transform relations, and register it to the template image. Then the template image and the registered image to be matched are matched and spliced.

However, it should be noted that in the above pose estimator, there can be one or more pictures to be matched. If there are multiple pictures to be matched, it is only necessary to repeat the same pose estimation process and then register them to the template image respectively.

Figure 3:
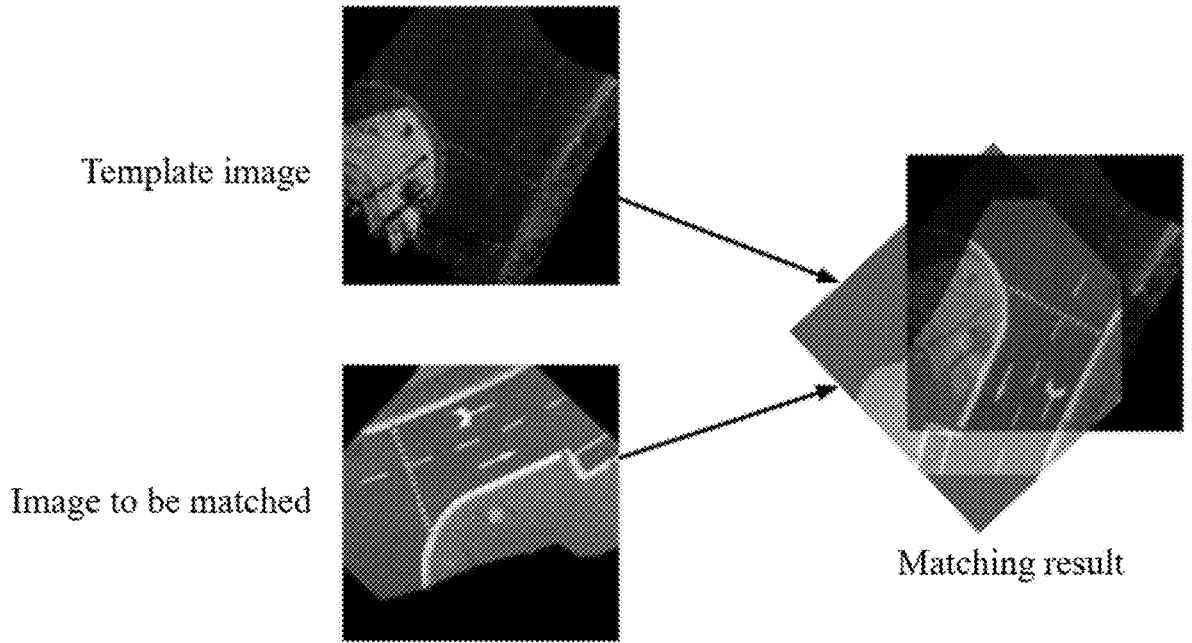
FIG. 3 is a schematic diagram of a graph registration process in one embodiment of the present disclosure.

As shown in FIG. 3, it is a concrete example of pose estimation and registration of a single group of heterogeneous images by using the pose estimator. The single group of heterogeneous pictures contains a template image and an image to be matched. After estimating the estimated values of four degrees of freedom (X, Y, theta and scale) by the above pose estimator, four-degree-of-freedom matching can be performed, and two pictures on the left are input and the matching results on the right are output. It can be seen that this method can better realize the matching and registration of two heterogeneous images.

Figure 4:
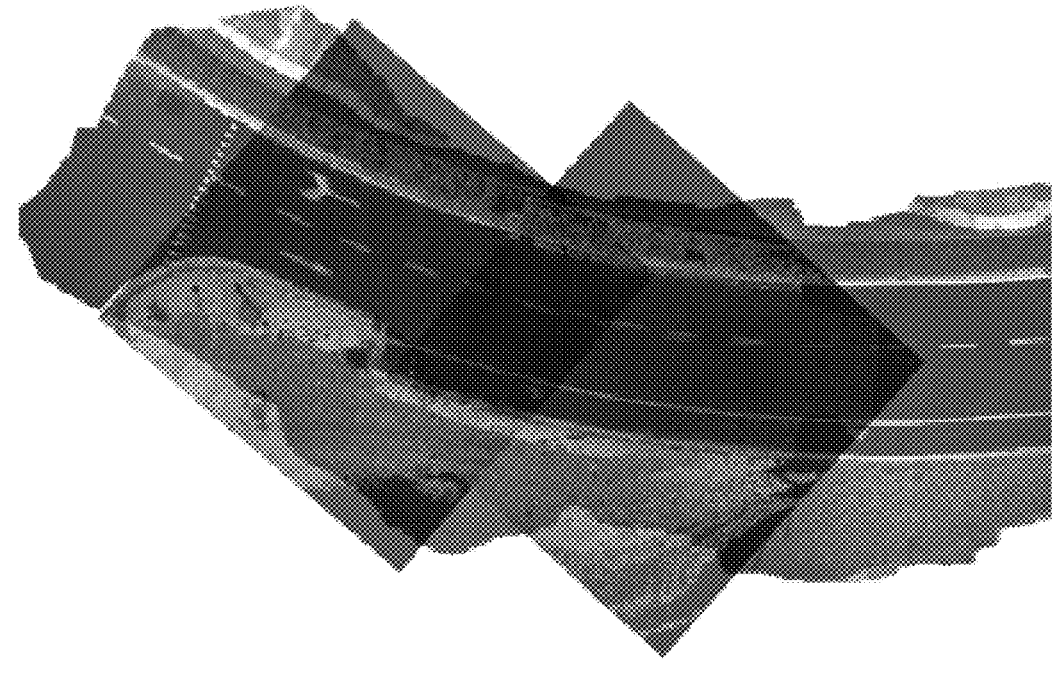
FIG. 4 is a schematic diagram of the result of graph registration in another embodiment of the present disclosure.

As shown in FIG. 4, it is another concrete example of pose estimation and registration of multiple groups of heterogeneous images by using the above pose estimator. The multi-group heterogeneous pictures contain a template image and two images to be matched. After estimating the estimated values of four degrees of freedom (X, Y, theta, scale) by the above pose estimator, four-degree-of-freedom matching can be performed, and multiple observation pictures can be matched in a global map as a template image, thus realizing multi-source data fusion.

In order to further evaluate the technical effect of the above method, detailed evaluation was carried out in different physical data sets, and the evaluation results are shown in Table 1, where the simulation data set is a graph randomly generated by a computer and its four degrees of freedom and appearance transform; the real data set 1 is a map collected by a ground robot with a monochrome camera and a ground map collected by a color camera of an aerial drone; the real data set 2 is a map collected by the ground robot using lidar and a ground map collected by the color camera of the aerial drone; the real data set 3 is a map collected by the color camera of the ground robot and a ground map collected by the color camera of the aerial drone.

TABLE 1

| | | | | | |
|---|---|---|---|---|---|
| Evaluation results of the present disclosure in different physical data sets | | | | | |
| Data set | X accu- racy % | Y accu- racy % | Rotation accu- racy % | Scaling accu- racy % | Running time ms |
| Analog data set | 98.7 | 97.9 | 99.3 | 98.1 | 102 |
| Real data set 1 | 95.2 | 92.3 | 99.1 | 97.5 | 101 |
| Real data set 2 | 97.6 | 91.4 | 98.9 | 95.0 | 105 |
| Real data set 3 | 92.9 | 94.7 | 99.1 | 98.6 | 99 |

From the results in the table, it can be seen that the present disclosure can accurately realize the accurate pose estimation and registration of heterogeneous pictures, and the required time is short, with high accuracy and real-time performance, which can meet the practical application requirements and can be applied to the fields of robot self-positioning.

In addition, in other embodiments of the present disclosure, a neural network-based pose estimation device for heterogeneous images can be provided, which includes a memory and a processor;

the memory is used for storing a computer program;

the processor is used for implementing the neural network-based pose estimation method for heterogeneous images when executing the computer program.

In addition, in other embodiments of the present disclosure, a computer-readable storage medium can be provided, on which a computer program is stored, and when executed by a processor, the computer program implements the aforementioned the neural network-based pose estimation method for heterogeneous images.

In addition, in other embodiments of the present disclosure, a neural network-based registration device for heterogeneous images is provided, which includes a memory and a processor;

the memory is used for storing a computer program;

the processor is used for implementing the neural network-based pose estimation method for heterogeneous images when executing the computer program.

In addition, in other embodiments of the present disclosure, a computer-readable storage medium can be provided, on which a computer program is stored, and when executed by a processor, the computer program implements the aforementioned neural network-based pose estimation method for heterogeneous images.

It should be noted that the above memory may include a Random Access Memory (RAM) or a Non-Volatile Memory (NVM), such as at least one disk memory. The processor can be a general-purpose processor, including a Central Processing Unit (CPU), a Network Processor (NP) or the like; it may also be a Digital Signal Processing (DSP), an Application Specific Integrated Circuit (ASIC), a Field-Programmable Gate Array (FPGA) or other programmable logic devices, discrete gates or transistor logic devices, or discrete hardware components. Of course, the device should also have the necessary components to realize the program running, such as a power supply, a communication bus and so on.

The embodiment described above is only a better solution of the present disclosure, but it is not intended to limit the present disclosure. Those skilled in the relevant technical field can make various changes and modifications without departing from the spirit and scope of the present disclosure. Therefore, all technical solutions obtained by equivalent substitutions or equivalent transforms shall fall within the protection scope of the present disclosure.

What is claimed is:

1. A neural network-based pose estimation method for heterogeneous images, comprising:

step S1, taking a first pre-trained U-Net network and a second pre-trained U-Net network as two feature extractors, taking a heterogeneous template image and a picture to be matched as two original input pictures of the two feature extractors, respectively, and extracting isomorphic features in the two original input pictures to obtain a first feature map and a second feature map which are isomorphic:

step S2, performing a Fourier transform on the first feature map and the second feature map obtained in step S1, respectively, to obtain respective magnitude spectra:

step S3, performing a logarithmic polar coordinate transform on the two magnitude spectra obtained in step S2, respectively, to allow the two magnitude spectra to be transformed from a Cartesian coordinate system to a logarithmic polar coordinate system, in such a manner that a rotation transform between the two magnitude spectra in the Cartesian coordinate system is mapped into a translation transform in a v direction in the logarithmic polar coordinate system:

step S4, performing a phase correlation solution on the two magnitude spectra after coordinate transform in step S3 to obtain a translation transform relation between the two magnitude spectra, and re-transforming according to a mapping relation between the Cartesian coordinate system and the logarithmic polar coordinate system in step S3 to obtain a rotation transform relation between the template image and the picture to be matched:

step S5, taking a third pre-trained U-Net network and a fourth pre-trained U-Net network as two feature extractors, taking a heterogeneous template image and a picture to be matched as two original input pictures of the two feature extractors, respectively, and extracting isomorphic features in the two original input pictures to obtain a third feature map and a fourth feature map which are isomorphic:

step S6, performing a Fourier transform on the third feature map and the fourth feature map obtained in step S5, respectively, to obtain respective magnitude spectra;

step S7, performing a logarithmic polar coordinate transform on the two magnitude spectra obtained in step S6, respectively, to allow the two magnitude spectra to be transformed from a Cartesian coordinate system to a logarithmic polar coordinate system, in such a manner that a scaling transform between the two magnitude spectra in the Cartesian coordinate system is mapped into a translation transform in an x direction in the logarithmic polar coordinate system:

step S8, performing a phase correlation solution on the two magnitude spectra after coordinate transform in step S7 to obtain a translation transform relation between the two magnitude spectra, and re-transforming according to a mapping relation between the Cartesian coordinate system and the logarithmic polar coordinate system in step S7 to obtain a scaling transform relation between the template image and the picture to be matched:

step S9, performing corresponding rotation and scaling transforms on the picture to be matched according to the rotation transform relation and scaling transform relation obtained in step S4 and step S8 to obtain a new template image of the picture to be matched:

step S10, taking a fifth pre-trained U-Net network and a sixth pre-trained U-Net network as two feature extractors, taking a template image and a new picture to be matched as two original input pictures of the two feature extractors, respectively, and extracting isomorphic features in the two original input pictures to obtain a fifth feature map and a sixth feature map that are isomorphic:

step S11, performing a phase correlation solution on the fifth feature map and the sixth feature map obtained in step S10 to obtain a translation transform relation in the x direction between the template image and the picture to be matched:

step S12, taking a seventh pre-trained U-Net network and a eighth pre-trained U-Net network as two feature extractors, taking a template image and a new picture to be matched as two original input pictures of the two feature extractors, respectively, extracting isomorphic features in the two original input pictures, and obtaining a seventh feature map and an eighth feature map which are isomorphic and only retain a translation transform relation between the original input pictures; and S13, performing a phase correlation solution on the seventh feature map and the eighth feature map obtained in step S12 to obtain a translation transform relation in the y direction between the template image and the picture to be matched, and completing a pose estimation of three transform relations of rotation, scaling and translation between the heterogeneous template image and the picture to be matched.

2. The neural network-based pose estimation method for heterogeneous images according to claim 1, wherein all eight U-Net networks in the estimation method are trained in advance, and a total loss function of training is a weighted sum of a rotation transform relation loss, a scaling transform relation loss, a translation transform relation loss in the x direction and a translation transform relation loss in the y direction between the template image and the picture to be matched.

3. The neural network-based pose estimation method for heterogeneous images according to claim 2, wherein weighted weights of the four losses in the total loss function are all 1.

4. The neural network-based pose estimation method for heterogeneous images according to claim 1, wherein a L1 loss is used for all four losses in the total loss function.

5. The neural network-based pose estimation method for heterogeneous images according to claim 1, wherein all eight U-Net networks in the estimation method are independent from each other, and each U-Net network extracts features through four down-sampled encoder layers and four up-sampled decoder layers.

6. A neural network-based registration method for heterogeneous images, wherein a pose estimation between a template image and a picture to be matched is obtained according to the neural network-based pose estimation method for heterogeneous images according to claim 1, and the picture to be matched is simultaneously rotated, scaled and translated according to estimated transform relations so as to be registered to the template image, and matching and splicing between the template image and the picture to be matched are achieved.

7. A neural network-based pose estimation device for heterogeneous images, comprising a memory and a processor;

wherein the memory is configured to store a computer program;

the processor is configured to implement the neural network-based pose estimation method for heterogeneous images according to claim 1 when executing the computer program.

\*   \*   \*   \*   \*